Oct. 5, 1926. 1,601,791
J. BING
MEANS FOR GRADUALLY CLOSING MAGNETIC CLUTCHES
Filed Dec. 11, 1924
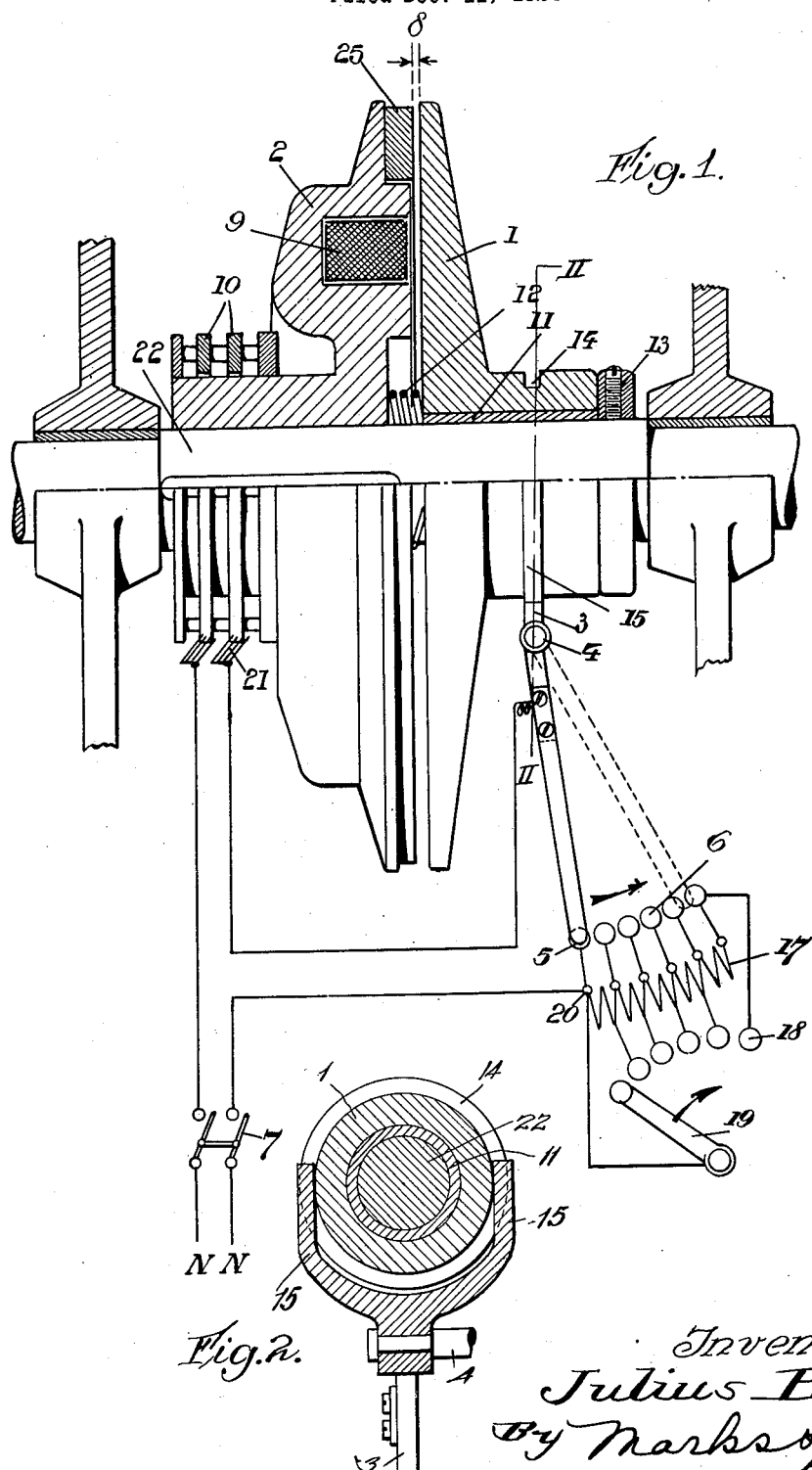

Patented Oct. 5, 1926.

1,601,791

UNITED STATES PATENT OFFICE.

JULIUS BING, OF EISENACH, THURINGIA, GERMANY, ASSIGNOR TO MAGNET-WERK G. M. B. H. EISENACH, SPEZIALFABRIK FÜR ELEKTROMAGNET-APPARATE, OF EISENACH, THURINGIA, GERMANY.

MEANS FOR GRADUALLY CLOSING MAGNETIC CLUTCHES.

Application filed December 11, 1924, Serial No. 755,288, and in Germany March 8, 1924.

My invention relates to electro-magnetically operated friction clutches and consists more particularly in means for enabling such clutches to be closed quite smoothly and without shock even when large masses are to be accelerated.

In the coupling of two rotating machine parts it is often necessary that the maximum torque transmissible by the clutch should be allowed to rise gradually and continuously from zero to a predetermined value. This is not possible in the case of electro-magnetic friction clutches of the kind at present used. The self-induction of the magnet winding does indeed result in the exciting current, and consequently the attractive force of the clutch only increasing slowly, so that the attracting would of itself proceed with a certain retardation. In practice however, especially when it is a question of accelerating large masses, grave disadvantages appear, for from the moment when the strength of the exciting current has become so great that the magnet armature is attracted the movement of the armature towards the poles of the magnet body proceeds with great acceleration, because naturally, due to the reduction of the air gap in consequence of the armature disc approaching the magnet body, the reluctance of the magnet circuit which substantially is represented by the air gap become very rapidly smaller, and on this account a sudden increase takes place in the magnetic attraction. Thus at the moment of engagement the magnetic clutch has an excess of application pressure, which may result in exceedingly heavy shocks in the acceleration of the driven members.

The present invention eliminates these fundamental defects of magnetic clutches by the fact that at the moment when the armature is set in motion a variable resistance, the magnitude of which increases with the decrease of the air gap, is automatically inserted in series with the exciting winding of the clutch. By suitably sub-dividing the resistance and also suitably dimensioning the magnitude of the resistance a constant application pressure can be produced at each position of the armature disc relatively to the magnet body when switching on. If the clutch is put in with this application pressure the strength of the existing current, and with it the magnetic application, can be increased again, for the purpose of strengthening the transmissible torque, by cutting out resistance, and this may be done in an accurately controllable manner, for since the air gap is now brought to a constant and very small amount a completely unambiguous relation exists between the increase in the strength of the exciting current, that is, in the adjustment of the series resistance, and the increase in the attractive force.

Further improvements will appear in the course of the more detailed description of the invention.

The invention is illustrated by way of example in the accompanying drawing. Figure 1 illustrates a clutch constructed according to the invention, the upper half being an axial sectional elevation and the lower half an outside elevation, the switching mechanism for the resistance being indicated diagrammatically. Figure 2 is a vertical section taken on line II—II of Figure 1.

In the case of the electro-magnetic clutch illustrated, it is a question of coupling a disc 1, which may be constructed for example as a toothed wheel or a belt pulley, with a shaft 22. The disc 1 forms at the same time the armature for the magnet body 2, which is keyed fast on to the shaft 22, and which contains the exciting winding 9. The exciting current is supplied to the winding in the usual manner through the medium of slip rings 10 from a source of current N, N. The disc 1 is rotatably supported on the shaft 22 by means of a journal bearing sleeve 11. It is pressed away from the magnet body 2 into its "off" position by a spring 12, a ring 13 secured to the shaft 22 serving as an abutment.

The hub part of the disc 1 is provided with an anular groove 14, in which engages the inner end of a lever 3, supported at 4, and having an adjusting clip 15. The other end of the lever 3 can slide by means of a contact brush 5, over a series of contacts 6 arranged in the form of an arc, which communicate with the individual turns of a series resistance 17. In a corresponding manner a second series of contacts 18 is connected with the series resistance. Upon the contacts 18 can slide the contact brush of a hand lever 19. This hand lever is connected with the starting point 20 of the series resistance 17 which communicates in its turn with one pole of a main switch 7. The lever 3 is connected to the brush 21 of one of the slip rings 10, while the other slip ring communicates directly with the second pole of the switch 7.

The method of working of the device is as follows:

In the "off" position the individual parts are in the position illustrated in the drawing. The spring 12 has pressed the armature disc 1 against the abutment 13, there being an air space 8 between the inner surface of the disc 1 and the opposite surface of the friction ring 25 connected with the magnet body 2. If the switch 7 is now closed, the magnet winding becomes fully excited and the armature 1 is thereby attracted. In proportion, however, as the armature approaches the magnet body, the free end of the lever 3 is shifted over the contacts 6 in the direction of the arrow, and in the same proportion more and more resistance is continually being inserted into the exciting circuit, so that when the armature 1 takes up its position as far as possible towards the left, that is to say, the position in which its inner surface bears against the inner surface of the friction ring 25, the whole of the resistance 17 is inserted. By this means the exciting current is so much weakened that the induction only assumes a comparatively small value, notwithstanding the diminution in the air gap. To this value, which, as no further displacement of the armature occurs, and consequently no further diminution in the air gap, now remains constant, there corresponds the torque which is the determining feature for the beginning of the clutching process. This torque can now be gradually strengthened in an accurately controllable manner by moving the hand lever 19 in a clockwise direction over the second row of contacts 18, whereby the series resistance is gradually cut out again, until after the attainment of the last contact the clutch receives the full strength of the exciting current.

The individual turns of the series resistance 17 may be so dimensioned that the induction in the magnet system remains substantially constant during the displacement of the armature 1 towards the left, or even decreases.

What I claim is:

1. In an electro-magnetic friction clutch having a magnet body and an armature, a device for closing the clutch without shock comprising: automatic means for gradually weakening the exciting current of the clutch in dependence upon the change of relative distance between the armature and the magnet body of the clutch, and means for arbitrarily increasing the exciting current.

2. In an electro-magnetic friction clutch having a magnet body, an armature and an exciting winding, a device for closing the clutch without shock, comprising a variable resistance adapted to be inserted in series with said exciting winding, means for increasing said resistance in positive dependence upon the movement of said armature in such a manner that as the armature approaches said magnet body the resistance is increased, means for switching on the exciting current, and means for arbitrarily increasing the exciting current.

3. In an electro-magnetic friction clutch having a magnet body, an armature and an exciting winding, a device for closing the clutch without shock, comprising a variable resistance adapted to be inserted in series with said exciting winding, means for increasing said resistance in positive dependence upon the movement of said armature in such a manner that as the armature approaches said magnet body the resistance is increased, means for switching on the exciting current, and means for arbitrarily increasing the exciting current.

4. An electro-magnetic clutch device, comprising a magnet body having an exciting winding, an armature displaceable relatively to said magnet body, a subdivided resistance, a switching member adapted to insert various portions of said resistance in series with said exciting winding and dependent in its position upon the position of said armature relative to said magnet body, and means for supplying electric current to said exciting winding and to said resistance.

5. An electro-magnetic clutch device comprising a magnet body having an exciting winding an armature displaceable relatively to said magnet body, a subdivided resistance, a switching member adapted to insert various portions of said resistance in series with said exciting winding and dependent in its position upon the position of said armature relative to said magnet body, means for supplying electric current to said exciting winding and to said resistance, and further means for short-circuiting individual portions of said resistance.

6. Electro-magnetic clutch mechanism comprising magnet body having an exciting winding, an armature displaceable relatively to said magnet body, a subdivided resistance, a series of contacts in electrical connection with individual sections of the resistance, a contact arm adapted to slide over said series of contacts and dependent in its motion upon the movement of said armature a circuit comprising said exciting winding, said contact arm, said series of contacts and said resistance, and means for supplying electric current to said circuit.

7. Electro-magnetic coupling mechanism comprising a magnet body having an exciting winding, an armature displaceable relatively to said magnet body, a subdivided resistance, a series of contacts in electrical connection with individual sections of the resistance, a contact arm adapted to slide over said series of contacts and dependent in its motion upon the movement of said armature, a second series of contacts connected with individual subdivisions of said resistance, a second contact arm adapted to slide over said second series of contacts, means for supplying electric current to said exciting winding, and a conductor connecting said second contact arm with one end of said resistance.

8. Electro-magnetic clutching mechanism comprising two magnet bodies displaceable relatively to one another in an axial direction, means for inducing a field of force in said magnet bodies, means for gradually weakening the induction of the magnet bodies, said weakening means being dependent upon the distance between the two magnet bodies in such a way that they are the more effective the smaller the distance between the two bodies.

9. Electro-magnetic clutching mechanism comprising two magnet bodies displaceable relatively to one another in an axial direction, means for inducing a field of force in said magnet bodies, means for gradually weakening the induction of the magnet bodies, said weakening means being dependent upon the distance between the two magnet bodies in such a way that they become more effective as the said distance becomes smaller, and means for overcoming at will the weakening effect produced by said weakening means.

10. In an electro-magnetic clutch, a pair of clutch members adapted to be drawn together, a magnetizing coil for said members, a variable resistance in series with said coil, and means for automatically switching on individual sections of said resistance in dependence upon the change of the relative distance between said clutch members.

11. In an electro-magnetic clutch, a pair of clutch members adapted to be drawn together, a magnetizing coil for said members, a variable resistance in series with said coil, means for automatically switching on individual sections of said resistance in dependence upon the change of the relative distance between said clutch members, and means for arbitrarily switching off individual sections of said resistance.

12. In an electro-magnetic clutch, a pair of clutch members adapted to be drawn together and separated, means for producing a magnetic flux for drawing said members together, and gradually acting automatic means in dependence upon the change of the relative distance between said clutch members for preventing said flux from reaching a predetermined amount.

13. In an electro-magnetic clutch, a pair of clutch members adapted to be drawn together and separated, means for producing a magnetic flux for drawing said members together, and gradually acting means in dependence upon the change of the relative distance between said clutch members for preventing said flux from reaching a predetermined amount.

14. In an electro-magnetic clutch, a pair of clutch members adapted to be drawn together and separated, means for producing a magnetic flux for drawing said members together, gradually acting means in dependence upon the change of the relative distance between said clutch members for preventing said flux from reaching a predetermined amount, and means for arbitrarily increasing said flux.

15. Electro-magnetic clutching mechanism comprising two magnet bodies displaceable relatively to one another in an axial direction, means for inducing a field of force in said magnet bodies, means for weakening the induction of the magnet bodies, said weakening means being dependent upon the distance between the two magnet bodies in such a way that they become more effective as the said distance becomes smaller, and means for overcoming at will the weakening effect produced by said weakening means.

In testimony whereof I have signed my name to this specification.

JULIUS BING.